United States Patent
Kuo (10) Patent No.: US 12,254,769 B2
(45) Date of Patent: Mar. 18, 2025

(54) METHOD AND SYSTEM FOR PUSHING A MESSAGE

(71) Applicant: MiTAC Digital Technology Corporation, Taoyuan (TW)

(72) Inventor: Hsin Liang Kuo, Taoyuan (TW)

(73) Assignee: MITAC DIGITAL TECHNOLOGY CORPORATION, Taoyuan (TW)

(*) Notice: Subject to any disclaimer, the term of this patent is extended or adjusted under 35 U.S.C. 154(b) by 419 days.

(21) Appl. No.: 17/654,748

(22) Filed: Mar. 14, 2022

(65) Prior Publication Data

US 2022/0292962 A1    Sep. 15, 2022

(30) Foreign Application Priority Data

Mar. 15, 2021 (TW) .................. 110109075

(51) Int. Cl.
| | |
|---|---|
| *G08G 1/0962* | (2006.01) |
| *G09F 21/04* | (2006.01) |
| *H04W 4/021* | (2018.01) |
| *H04W 4/23* | (2018.01) |
| *H04W 4/48* | (2018.01) |

(52) U.S. Cl.
CPC ........... *G08G 1/0962* (2013.01); *G09F 21/04* (2013.01); *H04W 4/021* (2013.01); *H04W 4/23* (2018.02); *H04W 4/48* (2018.02)

(58) Field of Classification Search
CPC ..... G08G 1/0962; G09F 21/04; H04W 4/021; H04W 4/23; H04W 4/48; H04L 67/12; H04L 67/52; H04L 67/55
See application file for complete search history.

(56) References Cited

U.S. PATENT DOCUMENTS

2020/0104088 A1* 4/2020 Wasserman ........ G06Q 30/0269
2020/0349610 A1   11/2020 Publicover et al.

FOREIGN PATENT DOCUMENTS

| CN | 1632811 A | 6/2005 |
|---|---|---|
| CN | 106327241 A | 1/2017 |
| CN | 107220847 A | 9/2017 |
| CN | 108764965 A | 11/2018 |
| CN | 108776907 A | 11/2018 |
| CN | 106204121 B | 3/2020 |
| CN | 112330376 A | 2/2021 |
| JP | 2007201742 A | 8/2007 |

OTHER PUBLICATIONS

Search Report appended to an Office Action, which was issued to Taiwanese counterpart application No. 110109075 by the TIPO on Jan. 20, 2022, with an English translation thereof.

* cited by examiner

Primary Examiner — Shon G Foley
(74) Attorney, Agent, or Firm — Lewis Roca Rothgerber Christie LLP (57) ABSTRACT

A method for pushing a message includes: when it is determined that an in-vehicle electronic device is located in a pre-determined geographic area, determining whether a user of a vehicle, on which the in-vehicle electronic device is installed, fits a pre-determined criterion; and when it is determined that the user of the vehicle fits the pre-determined criterion, pushing a message to the in-vehicle electronic device or a portable electronic device that is associated with the in-vehicle electronic device.

14 Claims, 5 Drawing Sheets

METHOD AND SYSTEM FOR PUSHING A MESSAGE

CROSS-REFERENCE TO RELATED APPLICATION

This application claims priority of Taiwanese Patent Application No. 110109075, filed on Mar. 15, 2021.

FIELD

The disclosure relates to a method and a system for pushing a message, particularly to a method and a system for pushing a message to one of an in-vehicle electronic device and a portable electronic device that is associated with the in-vehicle electronic device.

BACKGROUND

Conventionally, a push system is configured to push messages to one or more electronic devices (e.g., a smartphone) for viewing by the user(s) of the electronic device(s). Using such a system, a publisher or a central server may actively initiate a request for a given transmission of information such as an advertisement to the electronic devices. Transmitting advertisements to target audiences (i.e., people who may actually be interested in the product or service being advertised) may be an important issue for the advertisement provider, since it may increase potential sales.

SUMMARY

Therefore, an object of the disclosure is to provide a method that can push a message, such as an advertisement to a selected group of people.

According to the disclosure, the method for pushing a message is implemented using a push server that is in communication with a plurality of in-vehicle electronic devices installed respectively in a plurality of vehicles, and a vehicle information server that is in communication with the plurality of in-vehicle electronic devices and the push server. The method includes steps of:

determining, by the vehicle information server, whether any one of the in-vehicle electronic devices is located in a pre-determined geographic area;

when it is determined that one of the in-vehicle electronic devices is located in the pre-determined geographic area, determining, by the vehicle information server, whether a user of one of the vehicles, on which the one of the in-vehicle electronic devices is installed, fits a pre-determined criterion; and when it is determined that the user of the one of the vehicles, on which the one of the in-vehicle electronic devices is installed, fits the pre-determined criterion, transmitting, by the vehicle information server, a push command to the push server for the push server to push a message to the one of the in-vehicle electronic devices or a portable electronic device that is associated with the one of the in-vehicle electronic devices.

Another object of the disclosure is to provide a push system that is configured to implement the above-mentioned method.

According to the disclosure, the push system includes a plurality of in-vehicle electronic devices installed respectively in a plurality of vehicles, a push server that is in communication with said plurality of in-vehicle electronic devices, and a vehicle information server that is in communication with said plurality of in-vehicle electronic devices and said push server.

The vehicle information server is configured to:

determine whether any one of said in-vehicle electronic devices is located in a pre-determined geographic area;

determine, when it is determined that one of said in-vehicle electronic devices is located in the pre-determined geographic area, whether a user of one of the vehicles, on which the one of said in-vehicle electronic devices is installed, fits a pre-determined criterion; and transmit a push command to said push server when it is determined that the user of the one of the vehicles fits the pre-determined criterion, for said push server to push a message to the one of said in-vehicle electronic devices or a portable electronic device that is associated with the one of said in-vehicle electronic devices.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "coupled to" or "connected to" may refer to a direct connection among a plurality of electrical apparatus/devices/equipment via an electrically conductive material (e.g., an electrical wire), or an indirect connection between two electrical apparatus/devices/equipment via another one or more apparatus/devices/equipment, or wireless communication.

Figure 1:
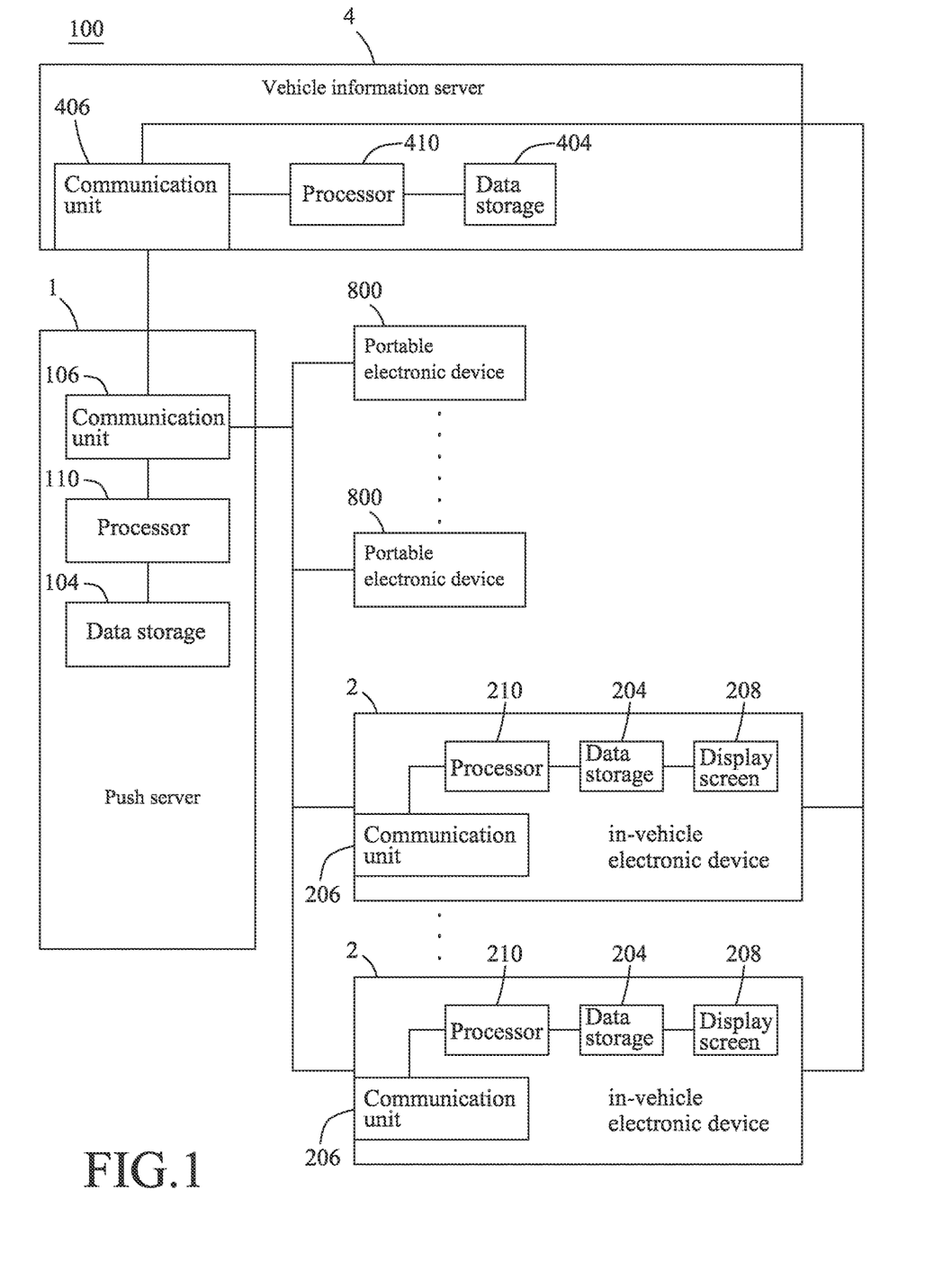
FIG. 1 is a block diagram of a push system according to one embodiment of the disclosure.

FIG. 1 is a block diagram of a push system 100 according to one embodiment of the disclosure. In this embodiment, the push system 100 includes a push server 1, a vehicle information server 4 coupled to the push server 1, and a plurality of in-vehicle electronic devices 2 that are in communication with the push server 1 and the vehicle information server 4.

The push server 1 may be embodied using a cloud server or other kinds of server devices, and includes a processor 110, a data storage 104 and a communication unit 106.

The processor 110 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), and/or a radio-frequency integrated circuit (RFIC), etc.

The data storage 104 may be embodied using computer-readable storage medium such as random access memory (RAM), read only memory (ROM), programmable ROM (PROM), firmware, flash memory, etc. In this embodiment, the data storage 104 stores a number of push data packages. Each of the push data packages may include contents constituting an advertisement for a product or a service, and may be in the form of text, image, audio, combinations thereof, etc.

The communication unit 106 may include at least one of a radio-frequency integrated circuit (RFIC), a short-range wireless communication module supporting a short-range wireless communication network using a wireless technology of Bluetooth® and/or Wi-Fi, etc., or a mobile communication module supporting telecommunication using Long-Term Evolution (LTE), the third generation (3G) and/or fifth generation (5G) of wireless mobile telecommunications technology, and/or the like.

The push server 1 is configured to communicate with the plurality of in-vehicle electronic devices 2 via the communication unit 106.

Each of the in-vehicle electronic devices 2 is installed in a vehicle such as an automobile, a motorcycle, etc., and may be embodied using a digital video recorder (DVR), a navigation device, or a combination thereof. Each of the in-vehicle electronic devices 2 includes a processor 210, a positioning component 204, a communication component 206 and a display screen 208.

The processor 210 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), and/or a radio-frequency integrated circuit (RFIC), etc.

The positioning component 204 may be a global positioning system (GPS) component that is capable of generating location data of the in-vehicle electronic device 2.

The communication unit 206 may include at least one of a radio-frequency integrated circuit (RFIC), a short-range wireless communication module supporting a short-range wireless communication network using a wireless technology of Bluetooth® and/or Wi-Fi, etc., or a mobile communication module supporting telecommunication using Long-Term Evolution (LTE), the third generation (3G) and/or fifth generation (5G) of wireless mobile telecommunications technology, and/or the like.

The vehicle information server 4 may be embodied using a cloud server or other kinds of server devices, and includes a processor 410, a data storage 404 and a communication unit 406. In this embodiment, the vehicle information server 4 may be associated with an advertisement platform, which is tasked with distributing advertisement to various electronic devices.

The processor 410 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), and/or a radio-frequency integrated circuit (RFIC), etc.

The data storage 404 may be embodied using computer-readable storage medium such as random access memory (RAM), read only memory (ROM), programmable ROM (PROM), firmware, flash memory, etc.

The communication unit 406 may include at least one of a radio-frequency integrated circuit (RFIC), a short-range wireless communication module supporting a short-range wireless communication network using a wireless technology of Bluetooth® and/or Wi-Fi, etc., or a mobile communication module supporting telecommunication using Long-Term Evolution (LTE), the third generation (3G) and/or fifth generation (5G) of wireless mobile telecommunications technology, and/or the like.

In this embodiment, the data storage 404 stores at least one set of area data associated with a pre-determined geographic area, at least one pre-determined criterion, and a plurality of sets of user information associated respectively with a plurality of users that are associated with the vehicles on which the plurality of in-vehicle electronic devices 2 are installed (e.g., the owners and/or drivers of the vehicles). The set of area data may include geographic coordinates covered by the pre-determined geographic area. Each set of user information may for example include an identification of the user, an age of the user, a gender of the user, a model of the vehicle that the user owns or drives, etc. It is noted that the identification of the user is also associated with a specific one of the in-vehicle electronic devices 2.

Specifically, the pre-determined criterion relates to user information, and includes a plurality of conditions such as a range of age (e.g., between 25 and 35 years old), a specific gender (e.g., male), a list of models of vehicles, etc. The pre-determined criterion is associated with a specific group of people who may be interested in a number of products and/or services that are to be promoted through advertising.

In some embodiments, the push server 1 is further configured to communicate with one or more portable electronic devices 800. Each of the portable electronic devices 800 is associated with one of the in-vehicle electronic devices 2 (e.g., a user of the portable electronic device 800 may access a website or a software application to bind the portable electronic device 800 with the corresponding one of the in-vehicle electronic device 2), and may be embodied using a smart phone, a tablet, a laptop, etc., and is associated with one vehicle and the user of the vehicle.

While, the push server 1 and the vehicle information server 4 are embodied as separate devices in this embodiment, it is noted that in some embodiments, the push server 1 and the vehicle information server 4 may be integrated into one main server that includes the components of the push server 1 and the vehicle information server 4 as described above, and that is configured to perform operations of the push server 1 and the vehicle information server 4 as described below.

It is noted that in some embodiments, the push system 100 may include at least one billboard that is installed in the pre-determined geographic area.

Figure 2:
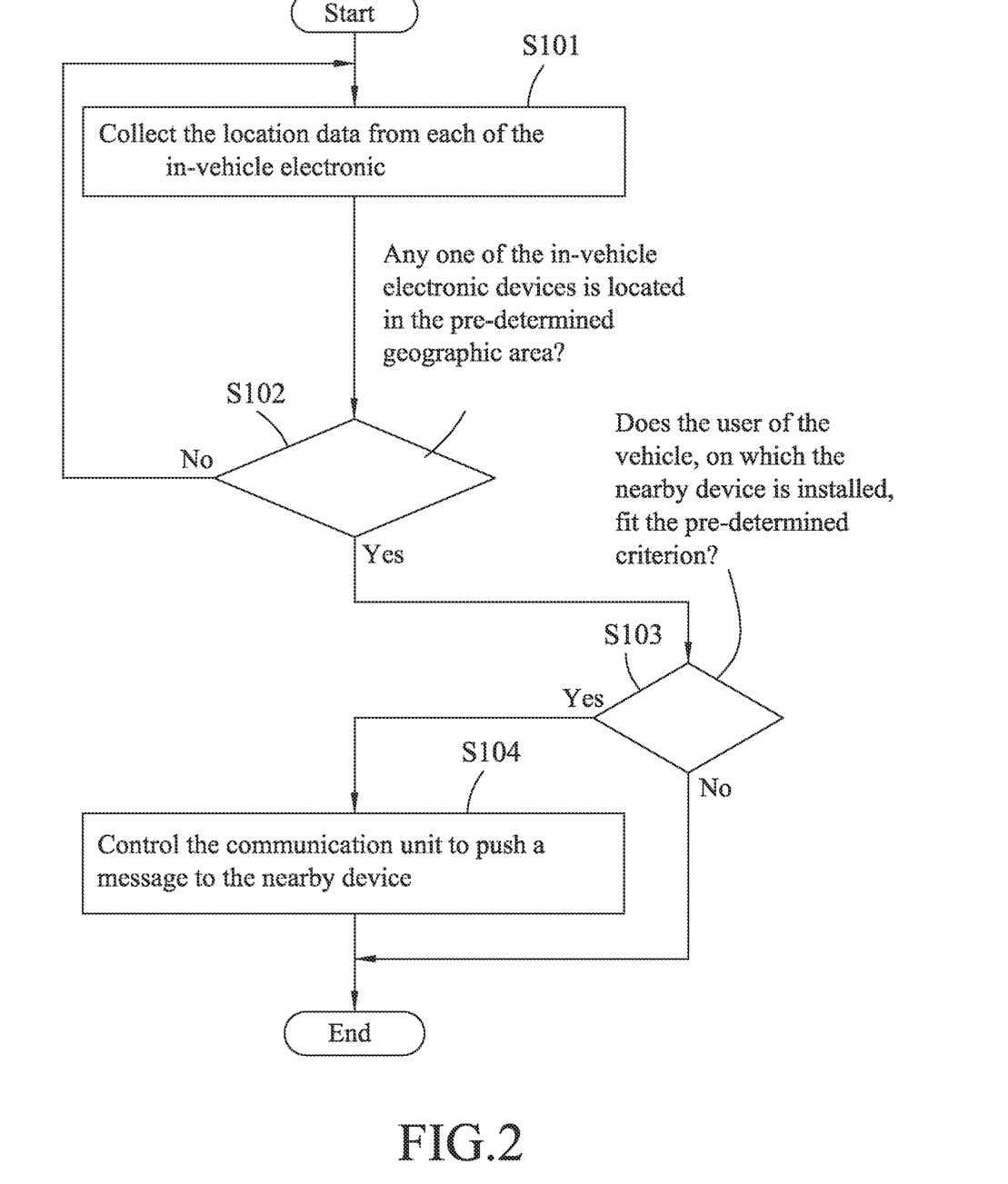
FIG. 2 is a flow chart illustrating steps of a method for transmitting a push message according to one embodiment of the disclosure.

FIG. 2 is a flow chart illustrating steps of a method for pushing a message according to one embodiment of the disclosure. In this embodiment, the method is implemented using the push system 100 of FIG. 1. In use, the in-vehicle electronic devices 2 are communicatively connected to the push server 1 and the vehicle information server 4, and the portable electronic devices 800 are communicatively connected to the push server 1. It is noted that the vehicles installed with the in-vehicle electronic devices 2 may be driven to move around, and the positioning component 204 of the in-vehicle electronic device 2 installed in each vehicle continuously generates location data which indicates a current location of the in-vehicle electronic device 2 and which is transmitted to the vehicle information server 4.

In step S101, the vehicle information server 4 collects the location data from each of the in-vehicle electronic devices 2 that are in communication therewith. As such, the vehicle information server 4 may determine the current locations of the in-vehicle electronic devices 2 based on the location data thus collected. It should be noted that, for each in-vehicle electronic device 2, the current location thereof can be considered as a current location of the vehicle, in which the in-vehicle electronic device 2 is installed.

In step S102, based on the location data received in step S101 and the set of area data stored in the data storage 404, the processor 410 of the vehicle information server 4 determines whether any one of the in-vehicle electronic devices 2 is located in the pre-determined geographic area. The pre-determined geographic area may be a geographical region such as a city, a county, etc. Alternatively, the pre-determined geographic area may cover an area within a certain radius of a specific landmark (e.g., the billboard, a building, a store, etc.); that is, when one of the in-vehicle electronic devices 2 moves to be within the certain radius (e.g., 100 meters) of the specific landmark, the processor 410 may determine that said one of the in-vehicle electronic devices 2 is located in the pre-determined geographic area.

When it is determined that one of the in-vehicle electronic devices 2 is located in the pre-determined geographic area (hereinafter referred to as "the nearby device 2"), the flow proceeds to step S103. Otherwise, the flow goes back to step S101 to continue receiving the location data. In some embodiments, the method may be terminated after determining that no in-vehicle electronic device 2 is located in the pre-determined geographic area, and may be restarted after a pre-determined time has elapsed (e.g., 15 minutes).

In step S103, the processor 410 of the vehicle information server 4 determines whether the user of the vehicle, on which the nearby device 2 is installed, fits the pre-determined criterion.

Specifically, in this embodiment, the processor 410 is configured to access the set of user information associated with the user of the vehicle, on which the nearby device 2 is installed. This may be done by, for example, determining a serial number of the nearby device 2 and identifying an association between the nearby device 2 and an identification of the user.

Afterward, the processor 410 is configured to determine whether the set of user information related to the user of the vehicle, on which the nearby device 2 is installed, fits the pre-determined criterion.

In this embodiment, the conditions of the pre-determined criterion include a range of age of between 25 and 35 years, a gender of male, and a list of models of vehicle. As such, the processor 410 may determine that the user of the vehicle, on which the nearby device 2 is installed, fits the pre-determined criterion when every item of the set of user information meets a corresponding one of the conditions (i.e., in this embodiment, the age of the user is within the range of age, the gender of the user is male, and the model of the vehicle that is associated with the user is among the list of models).

It is noted that in some embodiments, there may be a plurality of pre-determined geographic areas, and the data storage 404 may store a plurality of pre-determined criteria and a plurality of sets of area data. The sets of area data are associated with the pre-determined geographic areas, respectively. It may be possible that each of the pre-determined geographic areas is associated with a different pre-determined criterion since the products/services to be promoted may be different based on characteristics (e.g., demographics, cultural preferences, language, etc.) of the different pre-determined geographic areas. In some embodiments, one of the pre-determined geographic areas may be associated with a plurality of different pre-determined criteria, since a plurality of products/services targeting different demographical groups may be offered with respect to a single pre-determined geographic area.

For example, in one case, the user information indicates that the user is 30 years old, male, and drives a vehicle that is included in the list of models of vehicles. In such a case, the determination of step S103 is affirmative. In another case, the user information indicates that the user is 40 years old, male, and drives a vehicle that is included in the list of models of vehicle. In such a case, the determination of step S103 is negative.

When it is determined, in step S103, that the user of the vehicle, on which the nearby device 2 is installed, fits the pre-determined criterion, the flow proceeds to step S104. Otherwise, the method is terminated as the user of the vehicle located in the pre-determined geographic area may not potentially be interested in the product/service that is to be advertised.

In step S104, the processor 110 of the push server 1 controls the communication unit 106 to push a message to the nearby device 2. The message may include content of the advertisement of the product/service in the form of text, image and/or audio. As such, the nearby device 2 may proceed to display the content of the advertisement on the display screen 208 thereof, and/or play an audio part of the advertisement using a speaker thereof. Specifically, the processor 410 of the vehicle information server 4 may communicate with the push server 1 and transmit a push command to the push server 1 for the push server 1 to push the message to the nearby device 2. The push command includes, for example, a specific one of the push data packages associated with a product and/or a service, and the serial number of the nearby device 2.

It is noted that in some embodiments, the processor 110 of the push server 1 may control the communication unit 106 to push the message to the portable electronic device 800 that is associated with the nearby device 2. In some embodiments, the processor 110 may control the communication unit 106 to push the message to both the portable electronic device 800 and the nearby device 2.

It is noted that in some embodiments, the operations of step S103 may be omitted. That is to say, the operations of step S104 may be implemented as soon as the determination of step S102 is affirmative (that the vehicle has moved to the pre-determined geographic area). In some embodiments where the pre-determined geographic area is associated with a plurality of pre-determined criteria, the operations of step S103 may be repeated for each of the plurality of pre-determined criteria, in order to determine whether the user fits at least one of the plurality of pre-determined criteria.

In this manner, an advertisement provider is able to determine whether a user of a vehicle traveling in the pre-determined geographic area or approaching a specific landmark (e.g., a store, a billboard, etc.) may be interested in the product/service provided by the advertisement provider, and therefore a more personalized advertisement may be sent to the user of the vehicle in the form of a push message. In some embodiments, the billboard may also display the product/service provided by the advertisement provider, and may help create a more memorable impression on the user.

In some embodiments, the billboard may also include information on the product/service provided by the advertisement provider, or on how to purchase the product/service. The content on the billboard may be visible to the user of the one of the vehicles. For example, a two-dimensional code on the billboard may have a size such that when a user directs a front camera of the portable electronic device 800 toward the two-dimensional code when inside the vehicle a specific distance away from the billboard, a resulting image of the two-dimensional code on a display of the portable electronic device 800 may occupy 40-60 percent of the area of the display. The information may be in the form of a keyword for search, a two-dimensional code (e.g., a quick response (QR) code) that can be read by the portable electronic devices 800, a link to a website for subscription to and/or participation in giveaways, etc. Subsequently, the information inputted by the user while visiting the website associated with the link on the billboard may also be transmitted to the vehicle information server 4.

In some embodiments, one or more image capturing devices may be installed in proximity to the billboard. When the user interacts with the content of the billboard (e.g., accesses a link encoded in the two-dimensional code, makes a subscription, etc.), the vehicle information server 4 may also determine whether the set of user information needs to be updated. In one example, the vehicle information server 4 may determine that a vehicle moves within the proximity of the billboard at 16:00. Afterward, a link encoded in the two-dimensional code is accessed by the associated portable electronic device 800 at 16:05. As a result, the processor 410 may compare the image captured by the image capturing devices at the corresponding time instance and the pre-stored user information, so as to determine, for example, whether the user has changed to another vehicle, whether the user has changed a color of the vehicle, etc., and to update the pre-stored user information.

Figure 3:
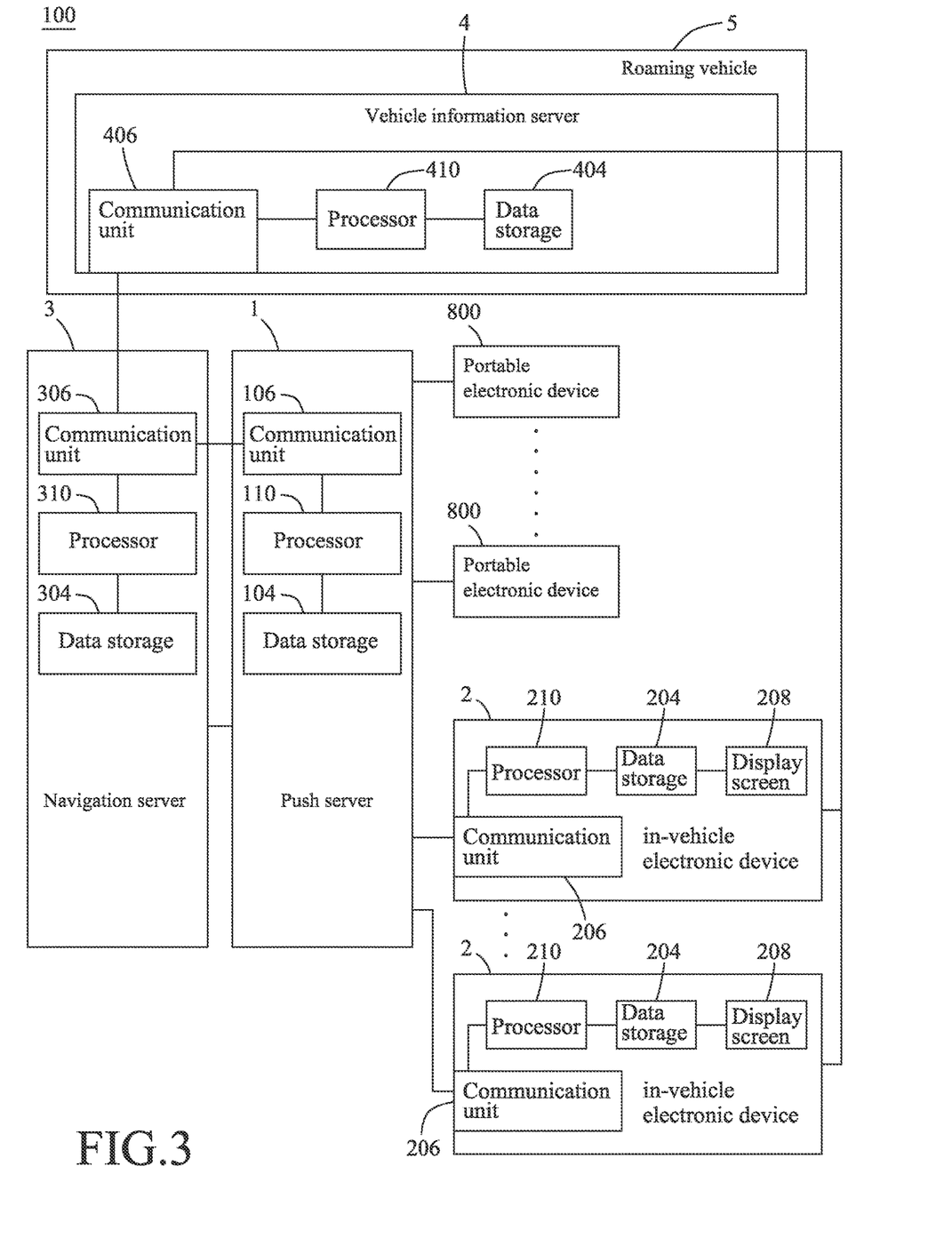
FIG. 3 is a block diagram of a push system according to one embodiment of the disclosure.

FIG. 3 is a block diagram of a push system 100 according to one embodiment of the disclosure. In this embodiment, the push system 100 includes a push server 1, a navigation server 3, a vehicle information server 4 coupled to the push server 1, and a plurality of in-vehicle electronic devices 2 that are in communication with the push server 1 and the vehicle information server 4.

The push server 1, the vehicle information server and the in-vehicle electronic devices 2 may be embodied using the same devices as described in the embodiment of FIG. 1, and details thereof are omitted herein for the sake of brevity.

The navigation server 3 may be embodied using a cloud server or other kinds of server devices, and includes a processor 310, a data storage 304 and a communication unit 306. It is noted that the components of the navigation server 3 may be similar to those included in the push server 1 and the vehicle information server 4, and details thereof are omitted herein for the sake of brevity.

In this embodiment, the navigation server 3 is connected to the push server 1 and the vehicle information server 4, and stores therein a track history of each of the in-vehicle electronic devices 2 based on the location data received by the vehicle information server 4 from the in-vehicle electronic devices 2 over time.

The vehicle information server 4 may be installed in a roaming vehicle 5, and may be configured to establish communication with the in-vehicle electronic devices 2 via, for example, a wireless communication (e.g., Bluetooth®). In this embodiment, the roaming vehicle 5 is dispatched to roam within a specific geographic area, such as a city.

For each of the in-vehicle electronic devices 2, when the roaming vehicle 5 moves into proximity of the in-vehicle electronic device 2 (e.g., a distance between the roaming vehicle 5 and the in-vehicle electronic device 2 is less than an effective distance for establishing the wireless communication therebetween) of one of a plurality of nearby vehicles, the vehicle information server 4 establishes the wireless communication with the in-vehicle electronic device 2. It is noted that the term "effective distance" used throughout the disclosure indicates a distance, between which the vehicle information server 4 and the in-vehicle electronic device 2 are able to establish the wireless communication with each other. In this embodiment, the communication unit 406 of the vehicle information server 4 may have a first communication range, and the in-vehicle electronic devices 2 may have a second communication range. As such, the effective distance may be the smaller one of the first communication range and the second communication range.

Figure 4:
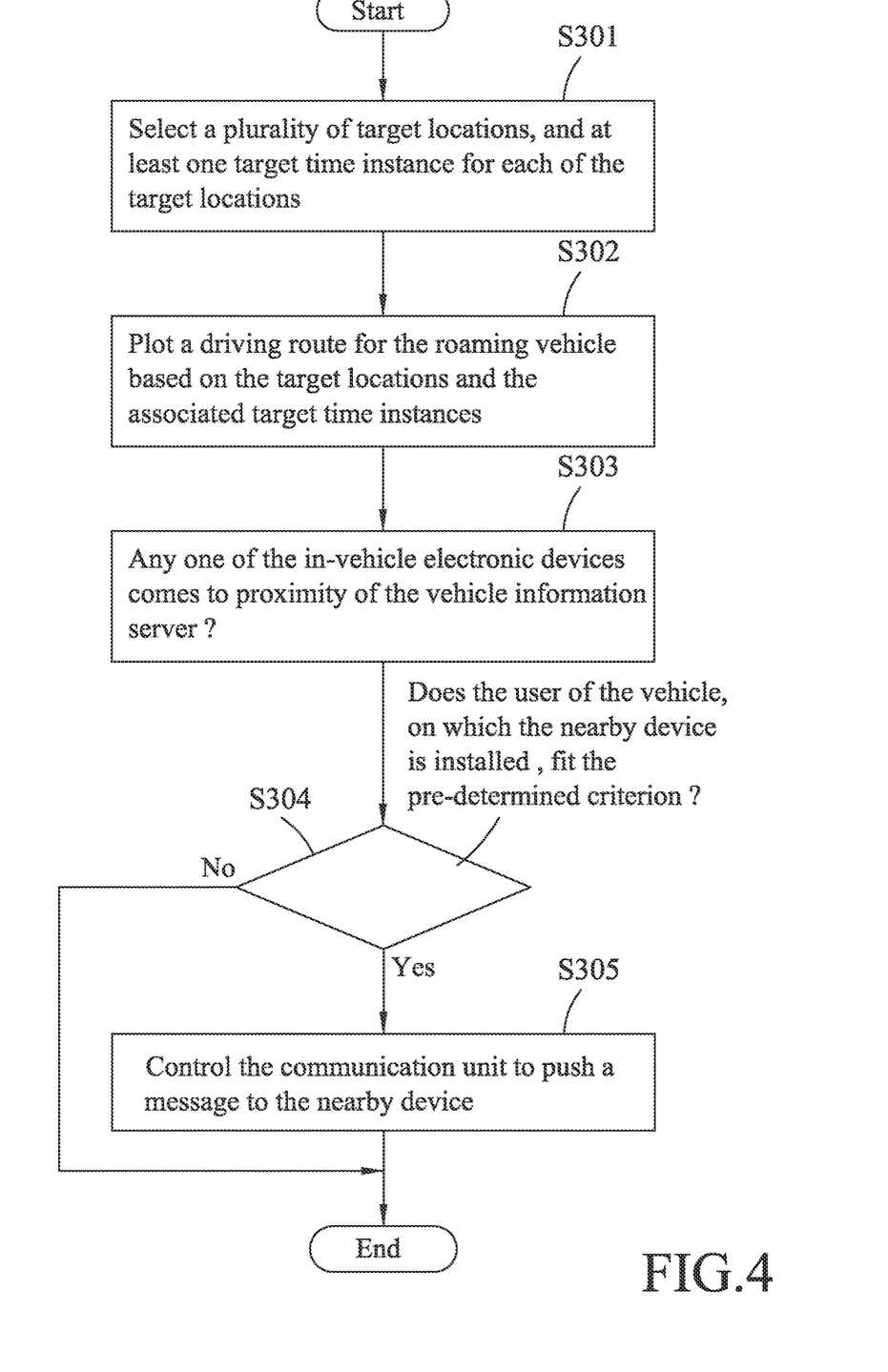
FIG. 4 is a flow chart illustrating steps of a method for transmitting a push message according to one embodiment of the disclosure.

FIG. 4 is a flow chart illustrating steps of a method for pushing a message according to one embodiment of the disclosure. In this embodiment, the method is implemented using the push system 100 of FIG. 3.

In step S301, the navigation server 3 selects a plurality of target locations, and at least one target time instance for each of the target locations.

Specifically, the processor 310 of the navigation server 3 may execute a navigation software product including instructions that, when executed by the processor 310, cause the processor 310 to access the track histories of the in-vehicle electronic devices 2 so as to determine a number of locations that are most likely to be passed by, by the vehicles (e.g., a cross section, an MRT station, etc.), as the target locations, and at least one time instance that corresponds with each of the locations at which the vehicles are most likely to pass by (e.g., 08:30, 17:00, etc.) as the target time instance. Each of the target locations may be predicted to have a high probability of having at least one vehicle, the user of which fits the pre-determined criterion, passing by at the target time instance (e.g., 75%). In other embodiments, each of the target locations may be predicted to have an expected number of vehicles, the users of which fit the pre-determined criterion, passing by at the target time instance, wherein the expected number is greater than a threshold.

In some embodiments, the sets of user information and the at least one pre-determined criterion stored in the vehicle information server 4 may also be taken into account in selecting the target locations and the target time instance.

In step S302, the processor 310 of the navigation server 3 plots a driving route for the roaming vehicle 5 based on the target locations and the associated target time instances selected in step S301. As such, when directed to move along the driving route, the roaming vehicle 5 is controlled to move pass each of the target locations at the target time instance(s) corresponding to the target location. It is noted that since the operations of plotting a driving route for a vehicle are well known in the relevant field of art, details thereof are omitted herein for the sake of brevity.

The roaming vehicle 5 then starts to move along the driving route. In step S303, when it is determined that one of the in-vehicle electronic devices 2 (also known as the nearby device 2) comes to proximity of the vehicle information server 4 (i.e., the distance between the roaming vehicle 5 and the nearby device 2 is less than the effective distance, and thus the nearby device 2 is detected by the vehicle information server 4), the vehicle information server 4 is configured to establish a wireless communication with the nearby device 2.

In step S304, the processor 410 of the vehicle information server 4 determines whether the user of the vehicle, on which the nearby device 2 is installed, fits the pre-determined criterion.

Specifically, in this embodiment, the processor 410 is configured to access the set of user information associated with the user of the vehicle, on which the nearby device 2 is installed. This may be done by, for example, determining a serial number of the nearby device 2 and identifying an association between the nearby device 2 and an identification of the user. Afterward, the processor 410 is configured to determine whether the set of user information related to the user of the vehicle, on which the nearby device 2 is installed, fits the pre-determined criterion. It is noted that in this embodiment, the determination of step S304 may be done in a manner similar to that of step S103, and details thereof are omitted herein for the sake of brevity.

In some embodiments, where the pre-determined geographic area is associated with a plurality of pre-determined criteria, the operations of step S304 may be repeated for each of the plurality of pre-determined criteria, in order to determine whether the user fits at least one of the plurality of pre-determined criteria.

When it is determined, in step S304, that the user of the vehicle, on which the nearby device 2 is installed, fits the pre-determined criterion, the flow proceeds to step S305. Otherwise, the method is terminated as the user of the vehicle located in the pre-determined geographic area may not potentially be interested in the product/service that is to be advertised.

In step S305, the processor 410 of the vehicle information server 4 transmits a push command to the processor 110 of the push server 1, which in turn controls the communication unit 106 to push a message to the nearby device 2. The message may include content of the advertisement of the product/service in the form of text, image and/or audio. As such, the nearby device 2 may proceed to display the content of the advertisement on the display screen 208 thereof, and/or play an audio part of the advertisement using a speaker thereof. Specifically, the vehicle information server 4 may communicate with the push server 1 and transmit a push command to the push server 1 for the push server 1 to push the message to the nearby device 2. The push command includes, for example, a specific one of the push data packages and the serial number of the nearby device 2.

It is noted that in some embodiments, the processor 110 of the push server 1 may control the communication unit 106 to push the message to the portable electronic device 800 that is associated with the nearby device 2. In some embodiments, the processor 110 may control the communication unit 106 to push the message to both the portable electronic device 800 and the nearby device 2.

In this embodiment, by first calculating the driving route on which more contact with potential customers of the product/service to be advertised is expected, and then employing the roaming vehicle 5 to move along the driving route, the chances of reaching more potential customers may be increased.

In some embodiments, a billboard may be mounted on an outer side of the roaming vehicle 5, which is effectively a moving advertisement. As such, the potential interactions with the billboard as described in the previous embodiments may also be implemented in this embodiment. In one example, an interactive link is provided on the billboard, and when an interaction between the portable electronic device 800 and the interactive link occurs, the resulting information such as a time instance of the interaction and a location of the portable electronic device 800 may also be recorded by the vehicle information server 4 and stored as a part of the track history in the navigation server 3. In some embodiments, the processor 110 of the push server 1 and/or the processor 410 of the vehicle information server 4 may control the billboard to display a color based on a number of interactions between the portable electronic device that is associated with the one of the in-vehicle electronic devices and the interactive link. For example, when more than a preset number of interactions have been recorded in a period of time (e.g., 5 in the last 10 minutes), the billboard may be controlled to display a color that indicates a large number of interactions (e.g., red). In some cases, the billboard may include light-emitting diode (LED) bulbs that may be controlled to blink when more than a preset number of interactions have been recorded in a period of time.

It is noted that in some embodiments, in plotting the driving route, an expected live traffic may also be taken into account. Specifically, after the target locations have been selected, the selecting of the target time instances, and subsequently, the plotting may be done such that the roaming vehicle 5 is expected to move to the target locations at time instances with more traffic (i.e., more vehicles and/or a slower traffic), thereby allowing more time for the in-vehicle electronic devices 2 to establish the wireless communication with the vehicle information server 4, or for the user to perform interactions with the billboard on the roaming vehicle 5. Also, during heavy traffic, the user may have more time to review the content of the pushed message and/or may inevitably be exposed to the billboard for longer.

It is noted that in some embodiments, a plurality of roaming vehicles 5 may be employed, each being equipped with a vehicle information server 4. In use, the roaming vehicles 5 may be dispatched to different parts of a city, so as to increase the potential reach to the users of the vehicles.

In some embodiments, the processor 410 of the vehicle information server 4 further determines, for each of the target locations, whether a number of the user of the vehicle corresponds with the expected number of vehicles calculated. This is to determine whether the previously calculated roaming route indeed achieves the expected potential reach to the users of the vehicles. In the cases it is determined that the previously calculated roaming route does not result in the expected potential reach, the processor 410 of the vehicle information server 4 may perform the operations of step 302 again to plot the driving route that excludes the target location.

This determination may be done while the roaming vehicle 5 is moving along the driving route. For example, the determination may be done after the roaming vehicle 5 has completed a portion of the driving route (e.g., 30%), or after the roaming vehicle 5 has been on the driving route for a certain period of time (e.g., one hour).

The determination may be done based on one or more of the following conditions. In the case that the number of the user is substantially less than the expected number of vehicles (e.g., less than 20% of the expected number of vehicles with the users fitting the pre-determined criterion), and/or when a number of the user of the vehicle is less than a threshold number (e.g., less than 10), the processor 410 of the vehicle information server 4 may perform the operations of step 302 again to plot the driving route that excludes the target location. It is noted that other conditions may also be used for determining whether the roaming route results in the expected potential reach, and is not limited as described above.

In some cases, in performing the operations of step 302 again the processor 410 of the vehicle information server 4 may use the number of user detected to replace the expected number of vehicles.

In the case that a plurality of roaming vehicles 5 are utilized, when the above condition occurs for one of the roaming vehicles 5, the processor 410 of the vehicle information server 4 may perform the operations of step 302 again to plot the driving route that excludes the target location at the time instance for other roaming vehicles 5.

It is noted that the above determination may be generally done in a relatively early stage of the roaming vehicle 5 moving on the roaming route. In this manner, the roaming route may be updated in the early stage when it is determined that the roaming route does not result in the expected potential reach, as opposed to the cases when more than 70% of the roaming route is travelled or when the roaming vehicle 5 has been on the roaming route for longer than two hours.

Figure 5:
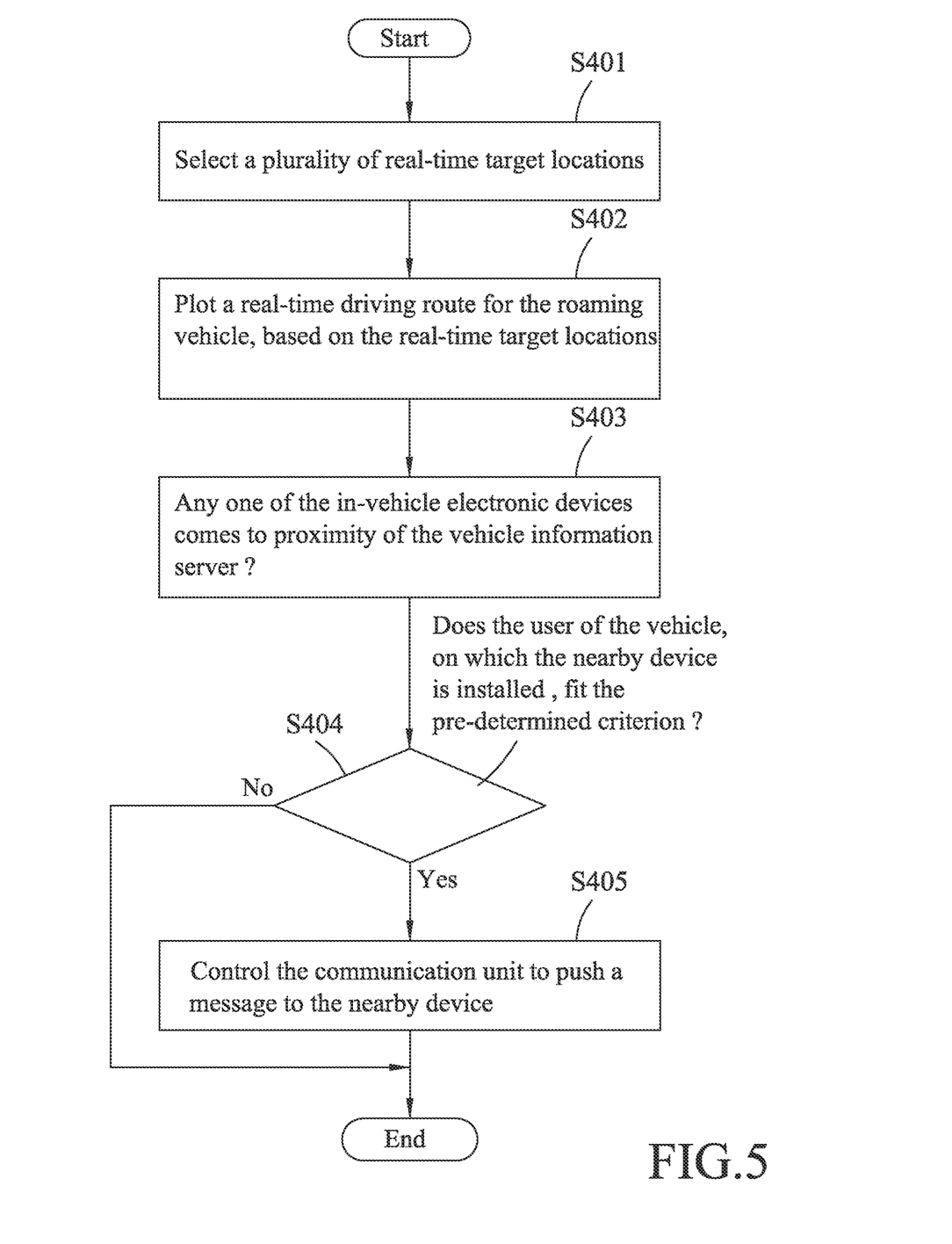
FIG. 5 is a flow chart illustrating steps of a method for transmitting a push message according to one embodiment of the disclosure.

FIG. 5 is a flow chart illustrating steps of a method for pushing a message according to one embodiment of the disclosure. In this embodiment, the method is implemented using the push system 100 of FIG. 3. In this embodiment, the navigation server 3 and the vehicle information server 4 are both installed on the roaming vehicle 5.

In use, each of the in-vehicle electronic devices periodically transmits the location data to the vehicle information server 4.

In step S401, in response of receipt of the location data from the in-vehicle electronic devices 2, the navigation server 3 selects a plurality of real-time target locations.

Specifically, the processor 310 of the navigation server 3 may execute a navigation software product including instructions that, when executed by the processor 310, cause the processor 310 to use the location data to determine a number of locations that are most likely to be passed-by by the vehicles as the real-time target locations.

Each of the real-time target locations may be predicted to have at least a threshold number of vehicles, the users of which fit the pre-determined criterion, at the real-time target location when the roaming vehicle 5 arrives. For example, in some embodiments, the user information and the at least one pre-determined criterion stored in the vehicle information server 4 may be taken into account in the selecting of the real-time target locations. The selected real-time target locations may be predicted to have at least a threshold number of vehicles that are installed with the in-vehicle electronic devices 2, and whose users fit the pre-determined criterion.

In step S402, the processor 310 of the navigation server 3 plots a real-time driving route for the roaming vehicle 5, based on the real-time target locations selected in step S401. As such, when directed to move along the real-time driving route, the roaming vehicle 5 is controlled to move pass the real-time target locations. It is noted that since the operations of plotting a driving route for a vehicle are well known in the relevant field of art, details thereof are omitted herein for the sake of brevity.

The roaming vehicle 5 then starts to move along the real-time roaming route. In step S403, when it is determined that one of the in-vehicle electronic devices 2 (also known as the nearby device 2) comes into proximity of the vehicle information server 4 (i.e., the distance between the roaming vehicle 5 and the nearby device 2 is less than the effective distance, and thus the nearby device 2 is detected by the vehicle information server 4), the vehicle information server 4 is configured to establish a wireless communication with the nearby device 2.

Afterward, in step S404, the processor 410 of the vehicle information server 4 determines whether the user of the vehicle, on which the nearby device 2 is installed, fits the pre-determined criterion.

The determination of step S404 may be done in a manner similar to that of step S103, and details thereof are omitted herein for the sake of brevity.

In some embodiments, where the pre-determined geographic area is associated with a plurality of pre-determined criteria, the operations of step S404 may be repeated for each of the plurality of pre-determined criteria, in order to determine whether the user fits at least one of the plurality of pre-determined criteria.

When it is determined, in step S404, that the user of the vehicle, on which the nearby device 2 is installed, fits the pre-determined criterion, the flow proceeds to step S405. Otherwise, the method is terminated as the user of the vehicle located in the pre-determined geographic area may not potentially be interested in the product/service that is to be advertised.

In step S405, the processor 410 of the vehicle information server 4 transmits a push command to the processor 110 of the push server 1, which in turn controls the communication unit 106 to push a message to the nearby device 2. The determination of step S405 may be done in a manner similar to that of step S104, and details thereof are omitted herein for the sake of brevity.

In this embodiment, by first calculating the real-time roaming route on which more contact with potential customers that may potentially be interested in the product/service to be advertised is expected, and then employing the roaming vehicle 5 to move along the real-time roaming route, the chances of reaching more potential customers of the product/service may be increased.

To sum up, the embodiments of the disclosure provide a method and a system for transmitting a push message to a number of in-vehicle electronic devices and/or a number of associated portable electronic devices.

Specifically, the vehicle information server 4 first determines whether one of the in-vehicle electronic devices 2 is located in a pre-determined geographic area (which may be around a specific landmark, a billboard, or in proximity to a roaming vehicle 5). Afterward, when it is determined that one of the in-vehicle electronic devices 2 is located in the pre-determined geographic area, the vehicle information server 4 determines whether the user of the vehicle on which the one of the in-vehicle electronic devices 2 is installed fits a pre-determined criterion. When it is determined that the user of the vehicle on which the one of the in-vehicle electronic devices 2 is installed fits a pre-determined criterion, the push server 1 transmits a push message to the one of the in-vehicle electronic devices 2 or a portable electronic device 800 that is associated with the one of the in-vehicle electronic devices 2.

It is noted that the push message, which constitutes an advertisement for a product or a service, may be more appealing to the users who are at the specific locations and/or whose user information fits the pre-determined criterion. As such, the method to selectively transmit the push message may be more efficient.

In some embodiments, a billboard is also employed to further increase an impression of the product or the service to be advertised using the push message.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for pushing a message, the method being implemented using a push server that is in communication with a plurality of in-vehicle electronic devices installed respectively in a plurality of vehicles, a vehicle information server that is in communication with the plurality of in-vehicle electronic devices and the push server, that is installed on a roaming vehicle, and that stores a plurality of sets of user information related respectively to users of the vehicles, and a navigation server that is coupled to the push server and the vehicle information server, and that stores a track history of each of the in-vehicle electronic devices, the method comprising steps of:

determining, by the vehicle information server, whether any one of the in-vehicle electronic devices is located in a pre-determined geographic area;

when it is determined that one of the in-vehicle electronic devices is located in the pre-determined geographic area, determining, by the vehicle information server, whether a user of one of the vehicles, on which the one of the in-vehicle electronic devices is installed, fits a pre-determined criterion; and when it is determined that the user of the one of the vehicles, on which the one of the in-vehicle electronic devices is installed, fits the pre-determined criterion, transmitting, by the vehicle information server, a push command to the push server for the push server to push a message to the one of the in-vehicle electronic devices or a portable electronic device that is associated with the one of the in-vehicle electronic devices;

wherein the step of determining whether any one of the in-vehicle electronic devices is located in a pre-determined geographic area includes: determining that one of the in-vehicle electronic devices is located in the pre-determined geographic area when a distance between the roaming vehicle and the one of the in-vehicle electronic devices is less than an effective distance for establishing a wireless communication between the roaming vehicle and the one of the in-vehicle electronic devices;

wherein the step of determining whether the user of the one of the vehicles, on which the one of the in-vehicle electronic devices is installed, fits a pre-determined criterion includes determining whether the set of user information related to the user of the vehicle, on which the one of the in-vehicle electronic devices is installed, fits the pre-determined criterion;

the method further comprising, prior to the step of determining whether any one of the in-vehicle electronic devices is located in a pre-determined geographic area, steps of:

selecting, by the navigation server, a plurality of target locations and a plurality of target time instances respectively for the target locations based on the track histories of the in-vehicle electronic devices; and plotting, by the navigation server, a driving route for the roaming vehicle based on the target locations and the target time instances, such that when directed to move along the driving route, the roaming vehicle is controlled to move pass the target locations respectively at the target time instances.

2. The method of claim 1, further comprising, prior to the step of determining whether any one of the in-vehicle electronic devices is located within a pre-determined geographic area, a step of collecting, by the vehicle information server, location data from each of the in-vehicle electronic devices;

wherein the step of determining whether any one of the in-vehicle electronic devices is located in a pre-determined geographic area is implemented based on the location data.

3. The method of claim 2, the vehicle information server storing a plurality of sets of user information related respectively to a plurality of users of the vehicles, wherein:

the step of determining whether the user of the one of the vehicles, on which the one of the in-vehicle electronic devices is installed, fits a pre-determined criterion includes determining whether the set of user information related to the user of the one of the vehicles, on which the one of the in-vehicle electronic devices is installed, fits the pre-determined criterion.

4. The method of claim 2, further being implemented using a billboard, wherein the pre-determined geographic area is defined by the billboard, and content of the billboard is related to the message pushed by the push server and is visible to the user of the one of the vehicles.

5. The method of claim 1, wherein the pre-determined criterion includes a plurality of conditions including a range of age, a gender and a list of models of vehicles, and each of the sets of user information includes an age of the user, a gender of the user and a model of the vehicle.

6. The method of claim 1, further comprising, prior to the step of determining whether any one of the in-vehicle electronic devices is located within a pre-determined geographic area, steps of:

collecting, by the vehicle information server, location data from each of the in-vehicle electronic devices;

selecting, by the navigation server, a plurality of real-time target locations based on the location data collected by the vehicle information server; and plotting, by the navigation server, a driving route for the roaming vehicle based on the real-time target locations, such that when directed to move along the driving route, the roaming vehicle is controlled to move pass the target locations.

7. The method of claim 1, further being implemented using a billboard mounted on the roaming vehicle, the method further comprising:

providing an interactive link on the billboard;

recording, by the vehicle information server, information on an interaction between the portable electronic device that is associated with the one of the in-vehicle electronic devices and the interactive link; and controlling the billboard to display a color based on a number of interactions between the portable electronic device that is associated with the one of the in-vehicle electronic devices and the interactive link.

8. A push system comprising:

a plurality of in-vehicle electronic devices installed respectively in a plurality of vehicles;

a push server that is in communication with said plurality of in-vehicle electronic devices; and a vehicle information server that is in communication with said plurality of in-vehicle electronic devices and said push server;

wherein said vehicle information server is configured to:
determine whether any one of said in-vehicle electronic devices is located in a pre-determined geographic area,
determine, when it is determined that one of said in-vehicle electronic devices is located in the pre-determined geographic area, whether a user of one of the vehicles, on which the one of said in-vehicle electronic devices is installed, fits a pre-determined criterion; and
transmit a push command to said push server when it is determined that the user of the one of the vehicles fits the pre-determined criterion, for said push server to push a message to the one of said in-vehicle electronic devices or a portable electronic device that is associated with the one of said in-vehicle electronic devices;

wherein said vehicle information server is installed on a roaming vehicle, and is configured to determine that one of said in-vehicle electronic devices is located in the pre-determined geographic area when a distance between the roaming vehicle and the one of said in-vehicle electronic devices is less than an effective distance for establishing a wireless communication between the roaming vehicle and the one of said in-vehicle electronic devices;

wherein said vehicle information server stores a plurality of sets of user information related respectively to users of the vehicles, and is configured to determine whether the user of the one of the vehicles, on which the one of said in-vehicle electronic devices is installed, fits a pre-determined criterion by determining whether the set of user information related to the user of the vehicle, on which the one of said in-vehicle electronic devices is installed, fits the pre-determined criterion;

the push system further comprising a navigation server that is coupled to said push server and said vehicle information server and that stores therein a track history of each of said in-vehicle electronic devices, wherein said navigation server is configured to:
select a plurality of target locations and a plurality of target time instances respectively for the target locations based on the track histories of said in-vehicle electronic devices; and
plot a driving route for the roaming vehicle based on the target locations and the target time instances, such that when directed to move along the driving route, the roaming vehicle is controlled to move pass the target locations respectively at the target time instances.

9. The push system of claim 8, wherein:
said vehicle information server is further configured to collect location data from each of said in-vehicle electronic devices, and is configured to determine whether any one of said in-vehicle electronic devices is located in the pre-determined geographic area based on the location data.

10. The push system of claim 9, wherein:
said vehicle information server stores a plurality of sets of user information related respectively to a plurality of users of the vehicles; and
said vehicle information server is configured to determine whether the user of the one of the vehicles, on which the one of said in-vehicle electronic devices is installed, fits the pre-determined criterion by determining whether the set of user information related to the user of the one of the vehicles, on which the one of said in-vehicle electronic devices is installed, fits the pre-determined criterion.

11. The push system of claim 10, further comprising a billboard, wherein the pre-determined geographic area is defined by said billboard, and content of said billboard is related to the message pushed by said push server and is visible to the user of the one of the vehicles.

12. The push system of claim 8, wherein the pre-determined criterion stored in said vehicle information server includes a plurality of conditions including a range of age, a gender and a list of models of vehicles, and each of the sets of user information includes an age of the user, a gender of the user and a model of the vehicle.

13. The push system of claim 8, wherein:
said vehicle information server is configured to collect location data from each of said in-vehicle electronic devices;
the push system further comprises a navigation server that is coupled to said push server and said vehicle information server and that is configured to receive the location data collected by said vehicle information server; and
said navigation server is configured to
select a plurality of real-time target locations based on the location data collected by said vehicle information server, and
plot a driving route for the roaming vehicle based on the real-time target locations, such that when directed to move along the driving route, the roaming vehicle is controlled to move pass the target locations.

14. The push system of claim 8, further comprising a billboard to be mounted on the roaming vehicle and that is provided with an interactive link, wherein said vehicle information server is configured to record information on an interaction between the portable electronic device that is associated with the one of said in-vehicle electronic devices and the interactive link, and said billboard is controlled to display a color based on a number of interactions between the portable electronic device that is associated with the one of the in-vehicle electronic devices and the interactive link.

* * * * *